US008345947B2

(12) United States Patent
Koretsune

(10) Patent No.: US 8,345,947 B2
(45) Date of Patent: Jan. 1, 2013

(54) PAPER-SHEET RECOGNITION APPARATUS

(75) Inventor: Hideyuki Koretsune, Hyogo (JP)

(73) Assignee: Glory Ltd., Himeji-shi (JP)

( * ) Notice: Subject to any disclaimer, the term of this patent is extended or adjusted under 35 U.S.C. 154(b) by 343 days.

(21) Appl. No.: 12/842,319

(22) Filed: Jul. 23, 2010

(65) Prior Publication Data

US 2011/0103677 A1 May 5, 2011

Related U.S. Application Data

(63) Continuation-in-part of application No. PCT/JP2008/051126, filed on Jan. 25, 2008.

(51) Int. Cl.
*G06K 9/00* (2006.01)

(52) U.S. Cl. ..................... 382/140; 250/559.01; 356/71; 902/7; 365/33; 348/92

(58) Field of Classification Search .................. 382/100, 382/103, 112, 135, 137, 138, 139, 140, 217, 382/218, 219, 220, 221, 222; 250/559.01, 250/559.05, 559.06; 194/4; 209/534; 235/379; 356/71; 902/7; 360/114.01; 365/32, 33; 430/39; 348/92, 135
See application file for complete search history.

(56) References Cited

U.S. PATENT DOCUMENTS

| | | | | |
|---|---|---|---|---|
| 4,396,902 | A * | 8/1983 | Warthan et al. | 382/320 |
| 4,973,851 | A * | 11/1990 | Lee | 250/556 |
| 6,931,148 | B2 * | 8/2005 | Mukai | 382/135 |
| 7,314,160 | B2 * | 1/2008 | Yoshida et al. | 235/379 |
| 7,377,425 | B1 * | 5/2008 | Ma et al. | 235/379 |
| 7,586,592 | B2 * | 9/2009 | Itako et al. | 356/71 |
| 8,028,911 | B1 * | 10/2011 | Hutson et al. | 235/449 |
| 8,180,137 | B2 * | 5/2012 | Faulkner et al. | 382/139 |
| 2002/0017445 | A1 | 2/2002 | Mukai | |
| 2002/0039206 | A1 | 4/2002 | Mukai | |
| 2006/0144923 | A1 | 7/2006 | VanKirk et al. | |
| 2007/0258633 | A1 | 11/2007 | Jones et al. | |

FOREIGN PATENT DOCUMENTS

| | | | |
|---|---|---|---|
| JP | 2001-351142 | A | 12/2001 |
| JP | 2002-109599 | A | 4/2002 |
| JP | 3819645 | B2 | 6/2006 |
| JP | 2007-64839 | A | 3/2007 |
| JP | 2007-64840 | A | 3/2007 |

* cited by examiner

*Primary Examiner* — Anand Bhatnagar
(74) *Attorney, Agent, or Firm* — Foley & Lardner LLP

(57) ABSTRACT

A paper-sheet recognition apparatus recognizes a paper sheet, which is being transported, by using an optical line sensor and a magnetic line sensor. The paper-sheet recognition apparatus includes a memory unit that stores therein magnetic templates defined in advance for respective types and respective transport directions of paper sheets, wherein the magnetic templates are defined at optical resolution representing resolution of the optical line sensor; a selecting unit that selects a magnetic template based on a type and a transport direction of the paper sheet, the type and the transport direction being obtained by analyzing optical data acquired by the optical line sensor; and a comparing unit that divides magnetic data acquired by the magnetic line sensor into pieces of data each corresponding to the optical resolution, and compares the magnetic template selected by the selecting unit with the divided magnetic data.

8 Claims, 12 Drawing Sheets

72

| EVALUATION TARGET AREA | | | | EVALUATION CONDITION | | |
|---|---|---|---|---|---|---|
| STARTING CH | NUMBER OF CH | STARTING LN | NUMBER OF LN | LOWER-LIMIT THRESHOLD | UPPER-LIMIT THRESHOLD | TYPE |
| 20 | 10 | -50 | 30 | 100 | 200 | TOTAL SUM VALUE |
| -10 | 20 | 40 | 20 | 300 | — | MAXIMUM VALUE |
| ⋮ | ⋮ | ⋮ | ⋮ | ⋮ | ⋮ | ⋮ |

BEFORE ROTATION CORRECTION

AFTER ROTATION CORRECTION

PAPER-SHEET RECOGNITION APPARATUS

CROSS-REFERENCE TO RELATED APPLICATIONS

This application is a continuation-in-part of PCT international application Ser. No. PCT/JP2008/051126 filed on Jan. 25, 2008 which designates the United States, the entire contents of which are incorporated herein by reference.

BACKGROUND OF THE INVENTION

1. Field of the Invention

The present invention relates to a paper-sheet recognition apparatus that recognizes paper sheets being transported by using an optical line sensor and a magnetic line sensor.

2. Description of the Related Art

There has been known a paper-sheet recognition apparatus that transports paper sheets such as banknotes by using a transport mechanism and recognizes the paper sheets by using an optical sensor that emits and receives light such as visible light and infrared light. Furthermore, in recent years, an increasing number of paper sheets are printed with ink containing magnetic material or have embedded security threads containing magnetic patterns to prevent counterfeiting and the like, so that a paper-sheet recognition apparatus that recognizes paper sheets by using a magnetic sensor has also been proposed (see Japanese Laid-open Patent Publication No. 2007-64840).

The paper-sheet recognition apparatus using such a magnetic sensor employs templates in which information, such as typical magnetic distribution of paper sheets and determination conditions, is defined, and compares magnetic data acquired by the magnetic sensor with the templates.

However, because banknotes on a transport path may be inclined with respect to a transport direction (hereinafter, described as "skew") or may be misaligned with respect to the center position of the transport path (hereinafter, described as "positional shift") while the banknotes are transported, it is necessary to prepare templates as many as combinations of multiple patterns for skew and multiple patterns for positional sift.

However, when paper sheets are banknotes, the above-mentioned templates need to be prepared for respective banknote denominations and respective banknote transport directions, and, when the templates prepared taking the skew and the positional shift into consideration are also considered, the number of the templates becomes huge. Therefore, there is a problem in that memory capacity for storing the templates increases and labor for defining the large number of templates also increases. Furthermore, the templates prepared taking the skew and the positional shift into consideration have a problem in that it is difficult to specify an evaluation target area in a small range because of an influence of an error related to positions. Therefore, when the templates are defined in accordance with the resolution of a magnetic sensor, which is generally lower than the resolution of an optical sensor, more labor is particularly necessary for specifying an evaluation tarter area in a small range.

In view of the above, there is a growing demand for realizing a paper-sheet recognition method capable of reducing the number of magnetic templates and specifying an evaluation target area in a small range easily and precisely, and a paper-sheet recognition apparatus to which the paper-sheet recognition method is applied.

SUMMARY OF THE INVENTION

The present invention has been made to solve the above problems in the conventional technology and an object of the present invention is to provide a paper-sheet recognition apparatus capable of reducing the number of magnetic templates and specifying an evaluation target area in a small range easily and precisely.

A paper-sheet recognition apparatus according to an aspect of the present invention recognizes a paper sheet, which is being transported, by using an optical line sensor and a magnetic line sensor. The paper-sheet recognition apparatus includes a memory unit that stores therein magnetic templates defined in advance for respective types and respective transport directions of paper sheets, wherein the magnetic templates are defined at optical resolution representing resolution of the optical line sensor; a selecting unit that selects a magnetic template based on a type and a transport direction of the paper sheet, the type and the transport direction being obtained by analyzing optical data acquired by the optical line sensor; and a comparing unit that divides magnetic data acquired by the magnetic line sensor into pieces of data each corresponding to the optical resolution, and compares the magnetic template selected by the selecting unit with the divided magnetic data.

A paper-sheet recognition apparatus according to another aspect of the present invention recognizes a paper sheet, which is being transported, by using an optical line sensor and a magnetic line sensor. The paper-sheet recognition apparatus includes a memory unit that stores therein magnetic templates and optical templates defined in advance for respective types and respective transport directions of paper sheet, wherein the magnetic template is defined at optical resolution representing resolution of the optical line sensor; an optical-data converting unit that performs rotation correction on optical data based on a skew angle and amount of positional shift of the paper sheet obtained by analyzing the optical data by the optical line sensor; a magnetic-template selecting unit that selects a magnetic template based on a type and transport direction of the paper sheet, the type and transport direction being obtained by analyzing the optical data; an optical-template selecting unit that selects an optical template for a same portion as a portion for the magnetic template; a comparing unit that divides magnetic data acquired by the magnetic line sensor into pieces of data each corresponding to the optical resolution, and compares the magnetic template selected by the magnetic-template selecting unit with the divided magnetic data; and an optical comparing unit that compares the optical template selected by the optical-template selecting unit with the optical data converted and subjected to the rotation correction by the optical-data converting unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a paper-sheet recognition apparatus according to the present invention will be described in detail below with reference to the accompanying drawings. In the following, the outline of a paper-sheet recognition method according to the present invention will be explained first, and thereafter, embodiments of a paper-sheet recognition apparatus to which the paper-sheet recognition method according to the present invention is applied will be explained.

Figure 1:
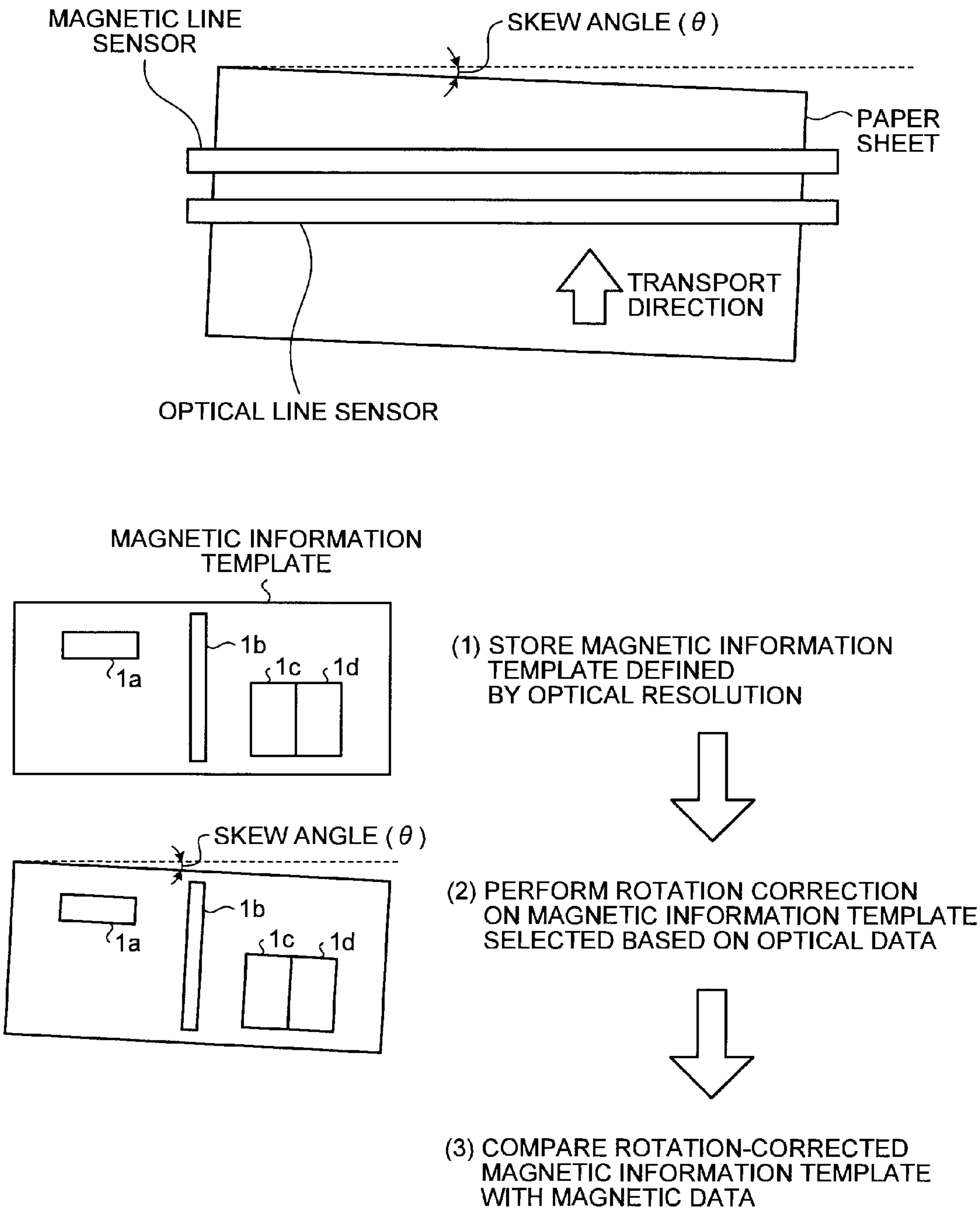
FIG. 1 is a diagram illustrating an outline of a paper-sheet recognition method according to the present invention.

First, the outline of the paper-sheet recognition method according to the present invention is described with reference to FIG. 1. FIG. 1 is a diagram illustrating the outline of the paper-sheet recognition method according to the present invention. As illustrated in FIG. 1, in the paper-sheet recognition method according to the present invention, a paper sheet is recognized by using an optical line sensor and a magnetic line sensor that are arranged in a direction perpendicular to a paper-sheet transport direction. In FIG. 1, a case is illustrated in which a paper sheet, particularly a banknote, is to be recognized.

Furthermore, as illustrated in FIG. 1, the paper sheet transported by a transport mechanism not illustrated in a paper-sheet recognition apparatus is in a state in which a wide edge of the banknote is skewed with respect to a direction perpendicular to the transport direction, i.e., skewed by a skew angle (θ) illustrated in FIG. 1, depending on the state of feed and transport of the banknote. Although not illustrated in FIG. 1, positional shift in a direction perpendicular to the transport direction, i.e., an amount of positional shift, also occurs.

Therefore, conventionally, templates for the magnetic line sensor (magnetic templates) need to be provided as many as combinations (A×B) of the A number of patterns for the skew angle and the B number of patterns as to the amount of positional shift. However, such magnetic templates also need to be prepared for respective banknote denominations, so that when the C number of types of banknotes are to be recognized and the banknote conveying directions (e.g., face, back, head, tail of a banknote) are also taken into consideration, the number of the magnetic templates becomes at least A×B×C×4.

In other words, conventionally, because the magnetic templates are prepared by taking the skew angle and the amount of positional shift into consideration in advance, there is a problem in that memory capacity for storing the magnetic templates increases and labor for defining a large number of the magnetic templates also increases. Furthermore, conventionally, the magnetic templates are defined according to the resolution of a magnetic sensor (hereinafter, described as "magnetic resolution"). However, because magnetic distribution of a banknote has finer patterns than the magnetic resolution, there is a problem with the accuracy of the magnetic templates.

In view of the above, in the paper-sheet recognition method according to the present invention, a magnetic template is defined in accordance with the resolution of an optical sensor (hereinafter, described as "optical resolution"), the magnetic template defined at the optical resolution is subjected to rotation correction by using the skew angle and the amount of positional shift acquired by the optical line sensor, and the rotation-corrected magnetic template is compared with magnetic data acquired by the magnetic line sensor.

More specifically, as illustrated in the figure, a magnetic information template (magnetic template) defined at the optical resolution is stored (see (1) of FIG. 1). In the magnetic information templates, areas 1*a*, 1*b*, 1*c*, and *d* for example are defined as evaluation target areas for respective templates. For example, 1*a* denotes a serial number portion in a banknote, 1*b* denotes a security thread containing a magnetic pattern, and 1*c* and 1*d* respectively denote a magnetic portion/a non-magnetic portion constituting a certain drawing pattern. Alternatively, two areas may be defined as evaluation target areas in a template. Furthermore, areas corresponding to a whole surface of a banknote may be defined as evaluation target areas.

Most of ink used for banknotes is associated with magnetism/non-magnetism, so that it is easy to define an evaluation target area in accordance with a design formed with such ink. Therefore, labor for defining the magnetic information template at the optical resolution is less than labor for defining the magnetic information template at the magnetic resolution.

Subsequently, in the paper-sheet recognition method according to the present invention, rotation correction is performed on the magnetic information template selected based on the optical data (see (2) of FIG. 1). More specifically, a banknote denomination and a transport direction, such as face or back, are acquired by performing image analysis of the optical data acquired by the optical line sensor, and a corresponding magnetic template is selected.

Furthermore, the skew angle and the amount of positional shift are acquired by performing the image analysis of the optical data, and rotation correction for superimposing the magnetic template onto the magnetic data is performed. Then, the rotation-corrected magnetic information template is compared with the magnetic data (see (3) of FIG. 1), and it is determined whether a data value of each evaluation target area is appropriate or not.

In this manner, in the paper-sheet recognition method according to the present invention, because the magnetic information template is defined at the optical resolution, the accuracy of the magnetic information template can be improved and the labor necessary for defining the magnetic information template can be reduced.

Furthermore, the magnetic information template defined at the optical resolution is subjected to the rotation correction by using the skew angle and the amount of positional shift acquired by the optical line sensor, and the rotation-corrected magnetic template is compared with the magnetic data acquired by the magnetic line sensor. Therefore, the magnetic information templates in which the skew angle and the amount of positional shift are taken into consideration are not necessary. As a result, it is possible to reduce the memory capacity for storing the magnetic information templates and the labor necessary for defining the magnetic information templates.

Embodiments of a paper-sheet recognition apparatus to which the paper-sheet recognition method according to the present invention illustrated in FIG. 1 is applied will be described below with reference to FIGS. 2 to 12.

Embodiment

Figure 2:
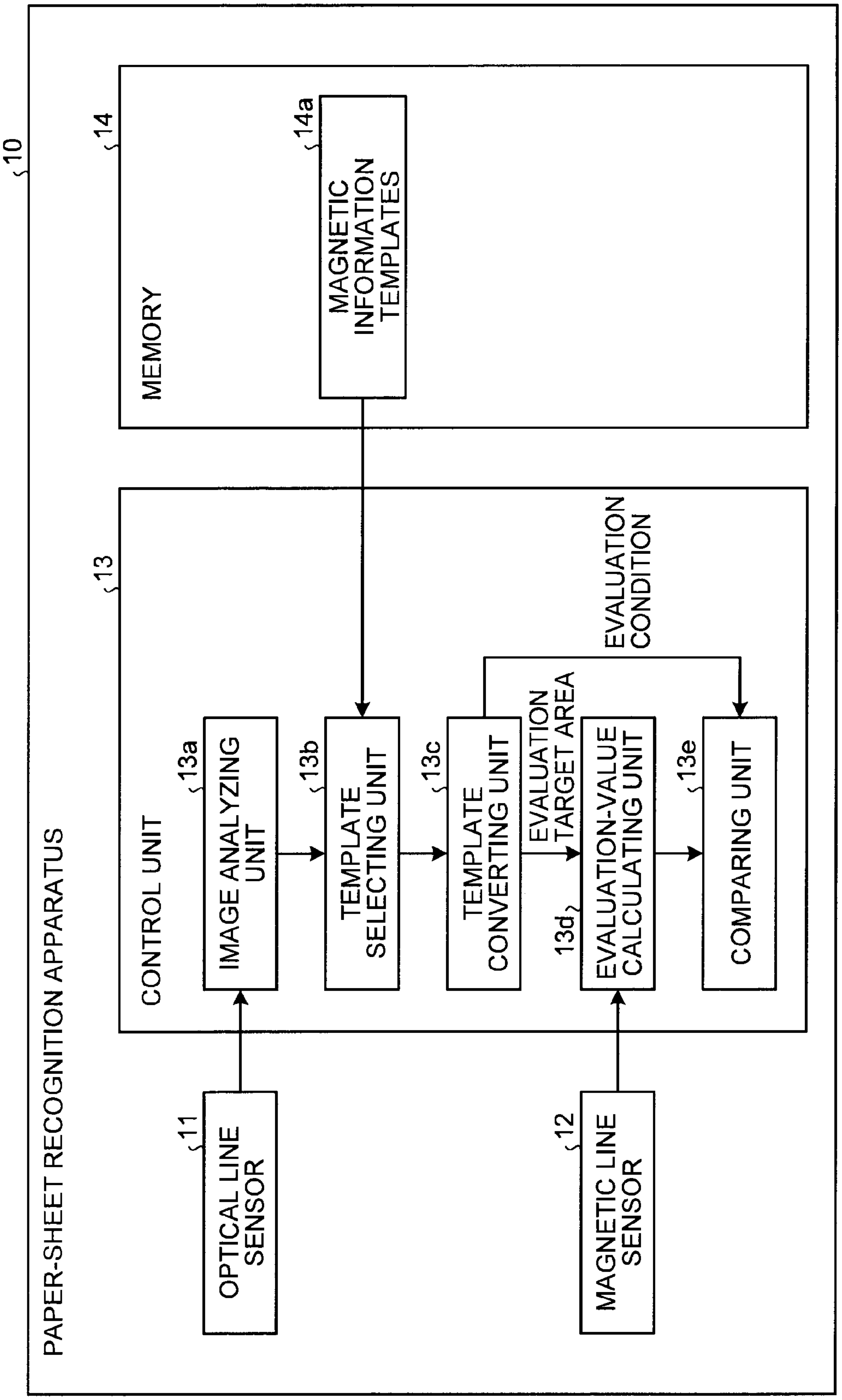
FIG. 2 is a block diagram illustrating a configuration of a paper-sheet recognition apparatus.

First, a configuration of a paper-sheet recognition apparatus 10 according to the embodiment is described with reference to FIG. 2. FIG. 2 is a block diagram illustrating the configuration of the paper-sheet recognition apparatus 10. In the figure, only components necessary for explaining features of the paper-sheet recognition apparatus 10 are illustrated, and general components such as a transport mechanism are omitted.

As illustrated in the figure, the paper-sheet recognition apparatus 10 includes an optical line sensor 11, a magnetic line sensor 12, a control unit 13, and a memory 14. The control unit 13 includes an image analyzing unit 13*a*, a template selecting unit 13*b*, a template converting unit 13*c*, an evaluation-value calculating unit 13*d*, and a comparing processing unit 13*e*. The memory 14 stores therein magnetic information templates 14*a*.

Figure 3:
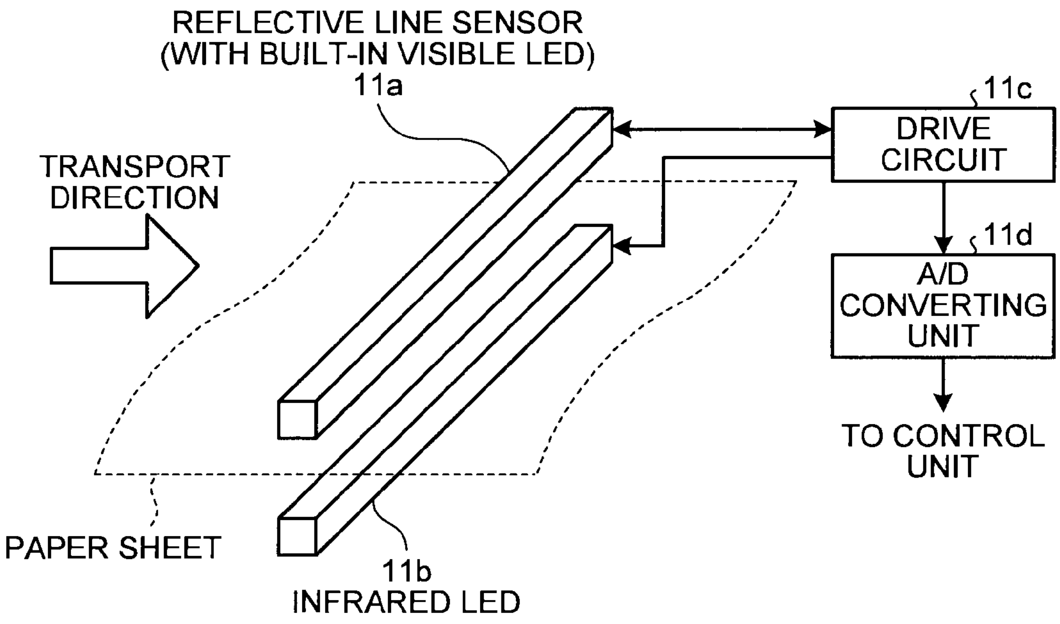
FIG. 3 is a diagram illustrating a configuration example of an optical line sensor.

The optical line sensor 11 is a line sensor that acquires optical data from paper sheets by using a light emitting-receiving element. A configuration example of the optical line sensor is described below with reference to FIG. 3. FIG. 3 is a diagram illustrating a configuration example of the optical line sensor 11.

As illustrated in FIG. 3, the optical line sensor 11 is arranged in a direction perpendicular to the transport direction, and includes a reflective line sensor 11*a* accommodating a visible LED (Light Emitting Diode) that emits visible light, and an infrared LED 11*b* that is arranged at a position opposite to the reflective line sensor 11*a* across a transport path and that emits infrared light. The reflective line sensor 11*a* includes light receiving elements for receiving reflected light, which is visible light emitted from the accommodated visible LED and reflected by a paper sheet, and transmitted light, which is infrared light emitted from the infrared LED 11*b* and transmitted through the paper sheet.

A drive circuit 11*c* is a circuit that performs a process of controlling operations of the reflective line sensor 11*a* and the infrared LED 11*b*. The drive circuit 11*c* also performs a process of sending optical data acquired by the reflective line sensor 11*a* to an A/D converting unit 11*d*. The A/D converting unit 11*d* performs a process of performing analog-to-digital conversion on the optical data received from the reflective line sensor 11*a* and sending the optical data to the control unit 13 illustrated in FIG. 2.

The light receiving elements in the reflective line sensor 11*a* are arrayed at a pitch of 1.524 mm, and perform scan at a pitch of 1.5 mm in the paper-sheet transport direction. For example, when a banknote to be recognized by the paper-sheet recognition apparatus 10 is in a size with the maximum value of 160 mm×82 mm, pixel data corresponding to at least 105 pixels×55 pixels=5775 pixels is acquired as image data. In practice, scan is performed for a larger area by taking a width of the transport path, skew, and the like into consideration.

Referring back to FIG. 2, the magnetic line sensor 12 is explained. The magnetic line sensor 12 is a line sensor that acquires magnetic data indicating a magnetic intensity pattern on a paper sheet by using a magnetic sensor. A configuration example of the magnetic line sensor 12, a magnetic-data calculation procedure, and a correspondence relationship between the optical resolution and the magnetic resolution are described below with reference to FIGS. 4, 5, and 6.

Figure 4:
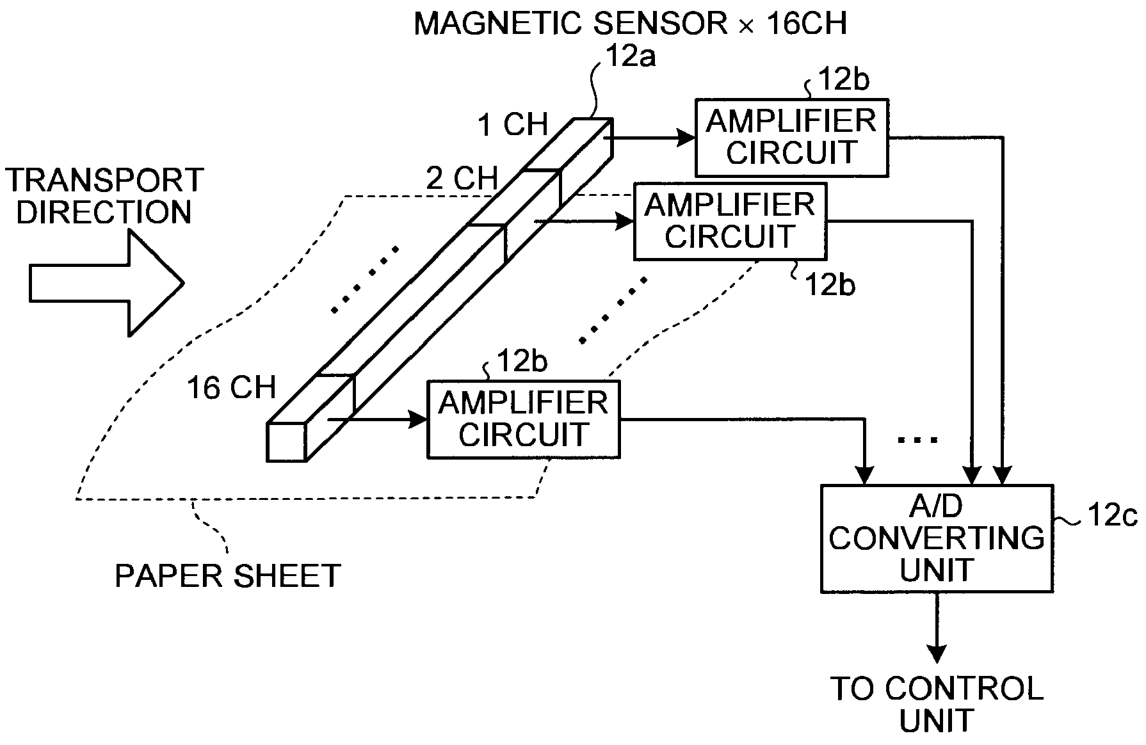
FIG. 4 is a diagram illustrating a configuration example of a magnetic line sensor.

FIG. 4 is a diagram illustrating a configuration example of the magnetic line sensor. As illustrated in FIG. 4, the magnetic line sensor 12 is arranged in a direction perpendicular to the transport direction, and configured such that magnetic sensors 12*a* corresponding to respective channels (CH) are arrayed as many as for 16 CH. The magnetic sensors 12*a* are connected to respective amplifier circuits 12*b*, the amplifier circuits 12*b* amplify magnetic data acquired by the magnetic sensors 12*a*, and magnetic data for 16 CH is sent to an A/D converting unit 12*c*. The A/D converting unit 12*c* performs a process of performing analog-to-digital conversion on the acquired magnetic data, and sending the magnetic data to the control unit 13 illustrated in FIG. 2.

The magnetic sensors 12*a* in the magnetic line sensor 12 are arranged at a pitch of 11 mm, and acquire data at a pitch of 1.5 mm in the paper-sheet transport direction. In practice, data is acquired by scan at a pitch of 0.25 mm, and magnetic data for 1 line (LN) is calculated by combining pieces of data for 6 scans. The magnetic-data calculation procedure is described below with reference to FIG. 5.

Figure 5:
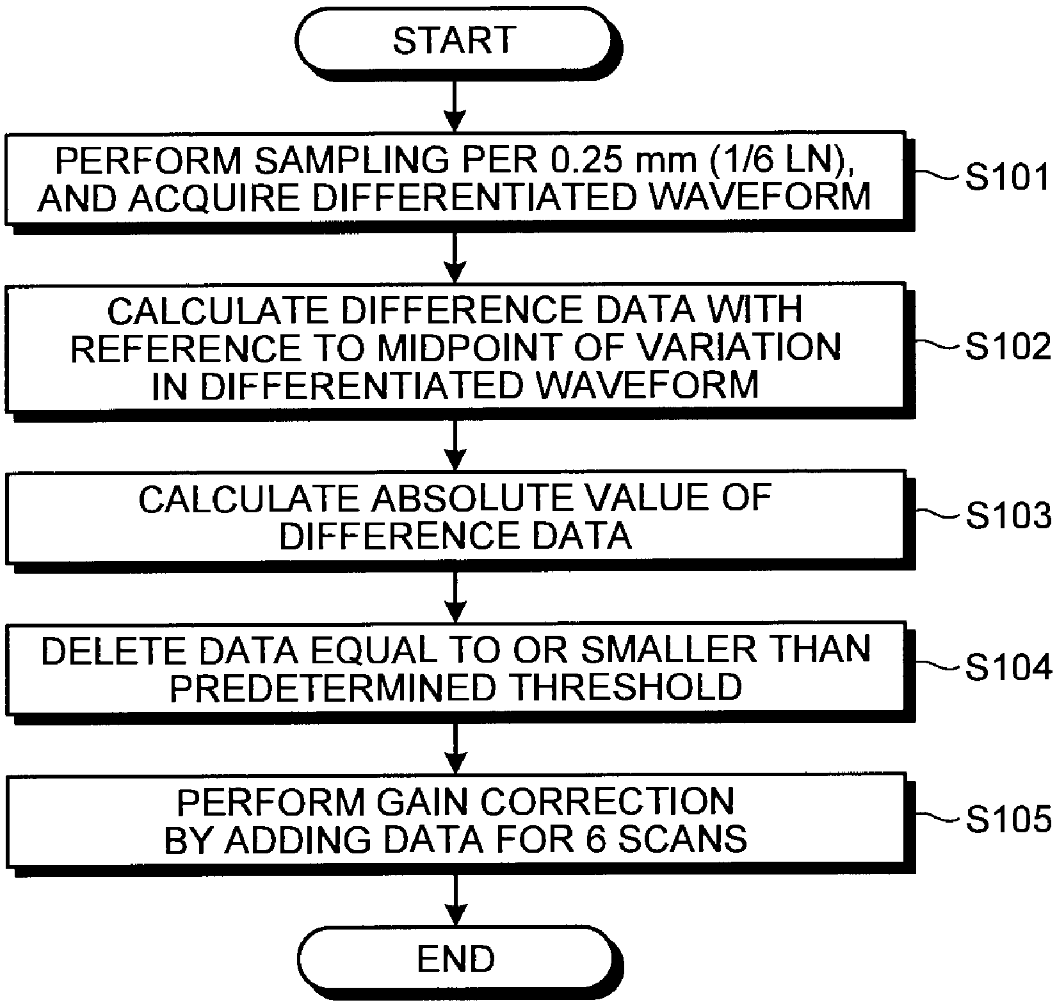
FIG. 5 is a flowchart illustrating a magnetic-data calculation procedure.

FIG. 5 is a flowchart illustrating the magnetic-data calculation procedure. As illustrated in FIG. 5, the magnetic line sensor 12 performs sampling per 0.25 mm (⅙ LN), and acquires the amount of variation in the magnetic data, i.e., a differentiated waveform (Step S101). Subsequently, difference data is calculated with reference to the midpoint of the variation in the differentiated waveform (Step S102). For example, when the data acquired at Step S101 has a variation range of 0 to 200, the difference data is calculated with reference to a value of 100 as the midpoint of the variation.

Subsequently, an absolute value of the difference data is calculated (Step S103), and data equal to or smaller than a predetermined threshold is deleted (Step S104). By the process at Step S104, noise cut is performed. Then, gain correction is performed by adding pieces of data for 6 scans (Step S105), so that magnetic data at a pitch of 1.5 mm is generated and process ends.

Figure 6A:
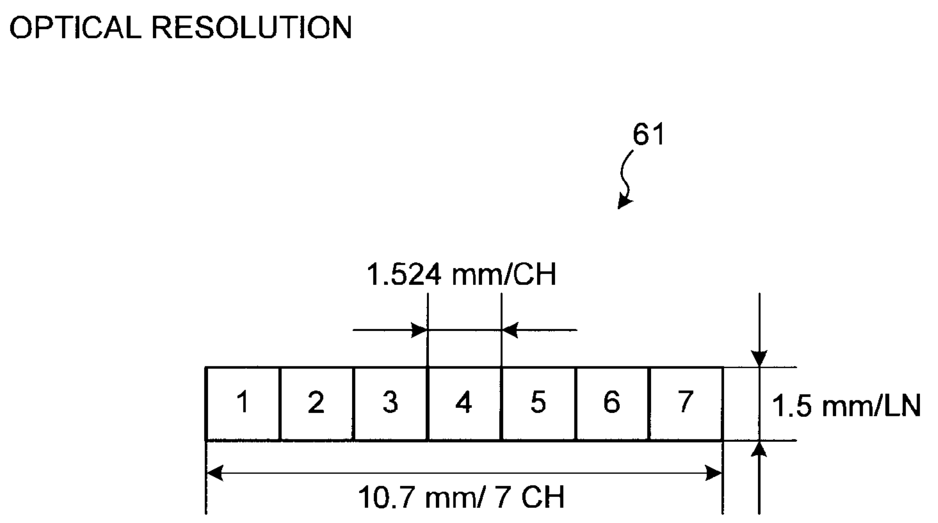
FIGS. 6A and 6B are diagrams illustrating a correspondence relationship between optical resolution and magnetic resolution.
Figure 6B:
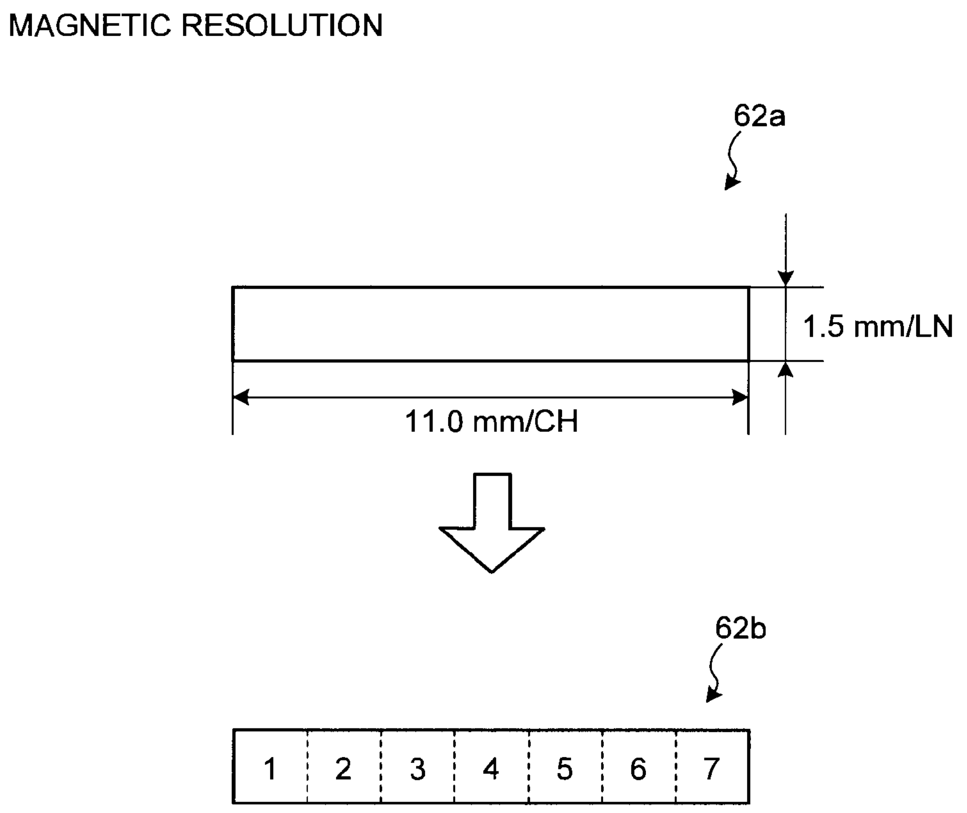

FIGS. 6A and 6B are diagrams illustrating the correspondence relationship between the optical resolution and the magnetic resolution. As illustrated at "(1) optical resolution" of FIG. 6, the optical resolution for the optical line sensor 11 has the size of 1.5 mm (in the LN direction)×1.524 mm (in the CH direction) (see 61 of FIG. 6).

On the other hand, as illustrated at "(2) magnetic resolution" of FIG. 6, the magnetic resolution of the magnetic line sensor 12 has the size of 1.5 mm (in the LN direction)×11.0 mm (in the CH direction) (see 62*a* of FIG. 6). In this manner, although the magnetic resolution is less dense than the optical resolution, as illustrated in 62*b* of FIG. 6, a physical 1 CH in the magnetic line sensor 12 is multiplied 1.524/11 times (multiplied by resolution ratio), so that pieces of data for 7 CH or 8 CH are virtually generated so as to be substantially identical to the optical resolution. In this case, it is assumed that each channel value in 62*b* is a value obtained by equally dividing the output value for a physical 1 CH in the magnetic line sensor 12 by 7 or 8. Whether to employ 7 CH or 8 CH is determined based on a pre-prepared conversion table not illustrated.

Referring back to FIG. 2, the control unit 13 is described. The control unit 13 is a processing unit that performs a process of performing image analysis of the optical data acquired by the optical line sensor 11, selecting a corresponding template from the magnetic information templates 14*a* stored in the memory 14 based on the result of the image analysis, performing a conversion process such as rotation correction on the selected template, and comparing the conversion-processed template with the magnetic data acquired by the magnetic line sensor 12.

The control unit 13 is formed of a circuit such as an FPGA (Field Programmable Gate Array) or a computer program. In this case, it is possible to allocate components for which certain processing speed is necessary to a process by the circuit, and allocate components for which certain processing speed is not necessary to a process by the computer program.

The image analyzing unit 13*a* is a processing unit that performs a process of receiving image data acquired by the optical line sensor 11 and analyzing the received image data to thereby acquire a banknote denomination, a banknote transport direction, a skew angle, and an amount of positional shift. The image analyzing unit 13*a* also performs a process of sending each acquired data to the template selecting unit 13*b*.

The template selecting unit 13*b* is a processing unit that performs a process of selecting a template corresponding to the banknote denomination and the banknote transport direction received from the image analyzing unit 13*a*, from the magnetic information templates 14*a* in the memory 14. The template selecting unit 13*b* also performs a process of sending the selected template, and sending the skew angle and the amount of positional shift received from the image analyzing unit 13*a* to the template converting unit 13*c*.

The template converting unit 13*c* is a processing unit that performs a process of performing rotation correction on the template selected by the template selecting unit 13*b*, by using the skew angle and amount of positional shift received from the template selecting unit 13*b*. The template converting unit 13*c* also performs a process of sending an evaluation target area contained in the template to the evaluation-value calculating unit 13*d* and sending an evaluation condition contained in the template to the comparing unit 13*e*. Examples of the evaluation target area and the evaluation condition will be described later with reference to FIG. 7, and the rotation correction will be described later with reference to FIGS. 8A and 8B.

The evaluation-value calculating unit 13*d* is a processing unit that performs a process of calculating, for each evaluation target area received from the template converting unit 13*c*, an evaluation value, such as a total sum value in an area, a maximum value in the area, and a minimum value in the area, of the magnetic data acquired by the magnetic line sensor 12. The evaluation-value calculating unit 13*d* also performs a process of sending the calculated evaluation value to the comparing unit 13*e*. A process of applying the magnetic information templates 14*a* to the magnetic data, which is performed by the evaluation-value calculating unit 13*d*, will be described later with reference to FIG. 9.

The comparing unit 13*e* is a processing unit that performs a process of comparing the evaluation value for each evaluation target area received from the evaluation-value calculating unit 13*d* with the evaluation condition for each evaluation target area received from the template converting unit 13*c*. The comparing unit 13*e* determines that the banknote as a recognition target is authentic, for example, when the evaluation conditions for all the evaluation target areas are satisfied.

The memory 14 is a memory unit formed of a memory such as a ROM (Read Only Memory), and stores therein the magnetic information templates 14*a* provided for respective banknote denominations and respective banknote transport directions. The magnetic information templates 14*a* are templates provided for the respective banknote denominations and the respective banknote transport directions, and containing positional information of the evaluation target areas and the evaluation conditions for the respective evaluation target areas.

Figure 7:
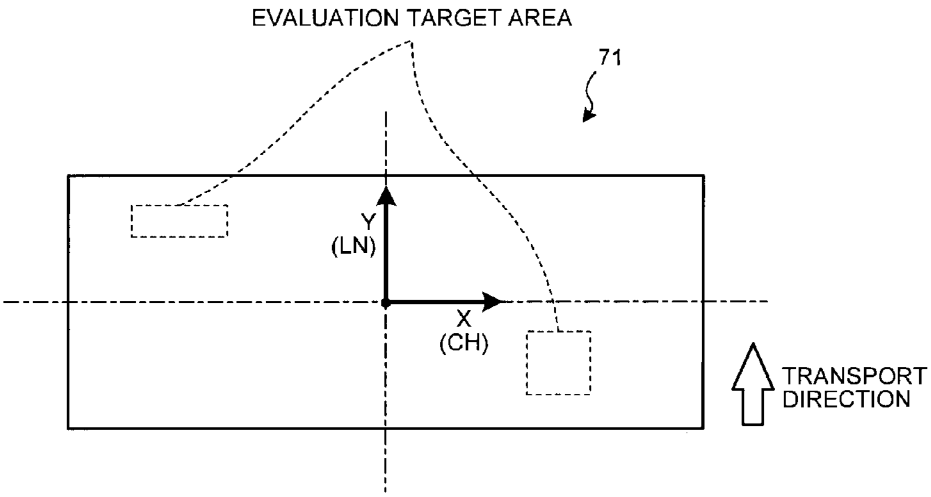
FIG. 7 is a diagram illustrating an example of a magnetic information template.

Next, an example of the magnetic information templates 14*a* are described with reference to FIG. 7. FIG. 7 is a diagram illustrating an example of the magnetic information templates 14*a*. In 71 of the figure, examples of the evaluation target areas defined on a two-dimensional banknote image are illustrated, and, in 72 of the figure, contents of the magnetic information templates 14*a* corresponding to 71 of the figure are illustrated.

As illustrated in 71 of the figure, a banknote image is represented as a two-dimensional coordinate with the origin at the center of the banknote, where a horizontal axis is X (corresponding to CH) and a vertical axis is Y (corresponding to LN). The minimum units of X (CH) and Y (LN) are virtual magnetic resolution (see 62*b* of FIG. 6B) that is obtained in accordance with the optical resolution. It is possible to define an arbitrary number of evaluation target areas to be evaluation targets of magnetic data values on the banknote image.

Furthermore, as illustrated in 72 of the figure, the magnetic information templates 14*a* are information containing respective "evaluation target areas" item and respective "evaluation conditions". The "evaluation target area" item contains a "starting CH" item, a "number of CH" item, a "starting LN" item, and a "number of LN" item. The "evaluation condition" item contains a "lower-limit threshold" item, an "upper-limit threshold" item, and a "type" item.

The "evaluation target area" item is information for specifying a range of each evaluation target area. The "starting CH" item and the "starting LN" item indicate a starting point of a rectangular area, and the "number of CH" item and the "number of LN" item respectively indicate a width and a height of the rectangular area. The "evaluation condition" item is information for specifying a condition that an evaluation value in the rectangular area specified by the "evaluation target area" item needs to satisfy.

For example, when a "total sum value" is specified in the "type" item, a total sum value of pieces of magnetic data in the rectangular area is used as the evaluation value, and, when the evaluation value is a value equal to or larger than a value specified in the "lower-limit threshold" item and equal to or smaller than a value specified in the "upper-limit threshold" value, the evaluation value is determined to be appropriate. It is possible to specify, in the "type" item, a "maximum value" for using the maximum value in the area as the evaluation target, a "minimum value" for using the minimum value in the area as the evaluation target, and the like other than the above-mentioned "total sum value". It is also possible to specify only one of the "lower-limit threshold" item and the "upper-limit threshold" item.

Furthermore, by defining the rectangular area along with a security thread, it is possible to determine whether a magnetic/non-magnetic pattern is present or not in each rectangular area.

Figure 8A:
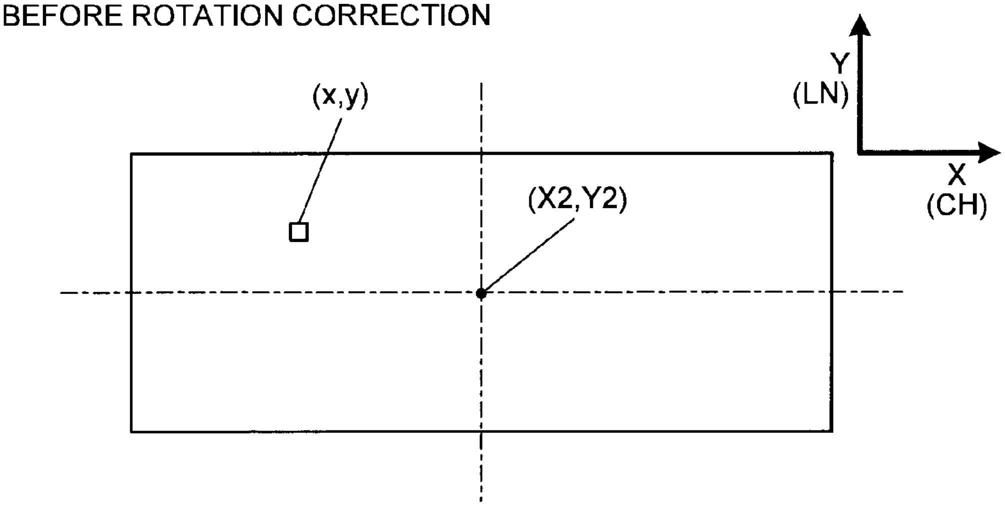
FIGS. 8A and 8B are diagrams illustrating an outline of rotation correction.
Figure 8B:
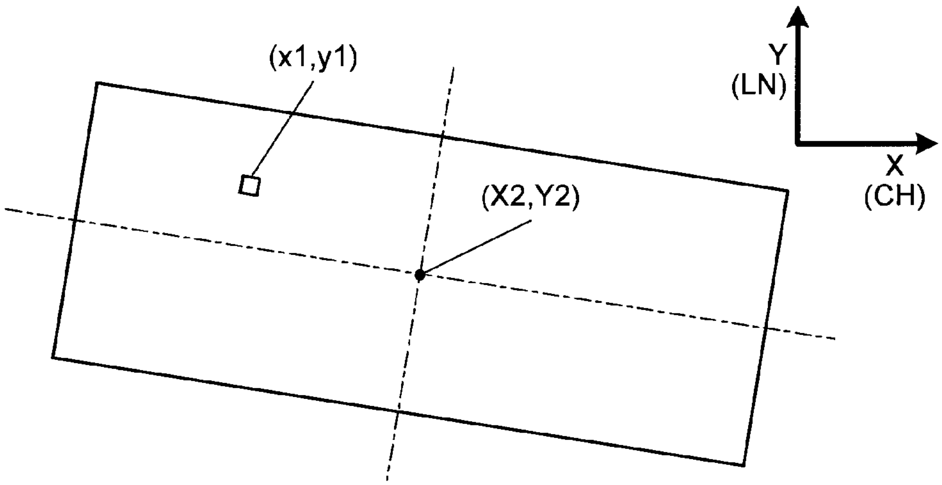

Next, the outline of the rotation correction performed by the template converting unit 13*c* illustrated in FIG. 2 is described with reference to FIGS. 8A and 8B. FIGS. 8A and 8B are diagrams illustrating the outline of the rotation correction. (X2, Y2) in FIG. 8 represents a center point of the banknote, and the rotation correction is performed about the center point. Furthermore, because the rotation correction is performed based on the center point of the banknote, correction of the above-mentioned amount of positional shift is also performed simultaneously.

Assuming that a coordinate of a rectangle of a minimum unit at a predetermined position is (x, y) as illustrated in "(1)

before rotation correction" in FIG. 8, and a coordinate of the rectangle of the minimum unit after the rotation correction is (x1, y1) as illustrated in "(2) after rotation correction", the relationship between the coordinates becomes the following.

$$\begin{pmatrix} x_1 \\ y_1 \end{pmatrix} = \begin{pmatrix} \cos\theta & -\sin\theta \\ \sin\theta & \cos\theta \end{pmatrix} \begin{pmatrix} x - X2 \\ y - Y2 \end{pmatrix} + \begin{pmatrix} X2 \\ Y2 \end{pmatrix} \quad (1)$$

Here, "θ" in Equation (1) represents the skew angle.

Figure 9:
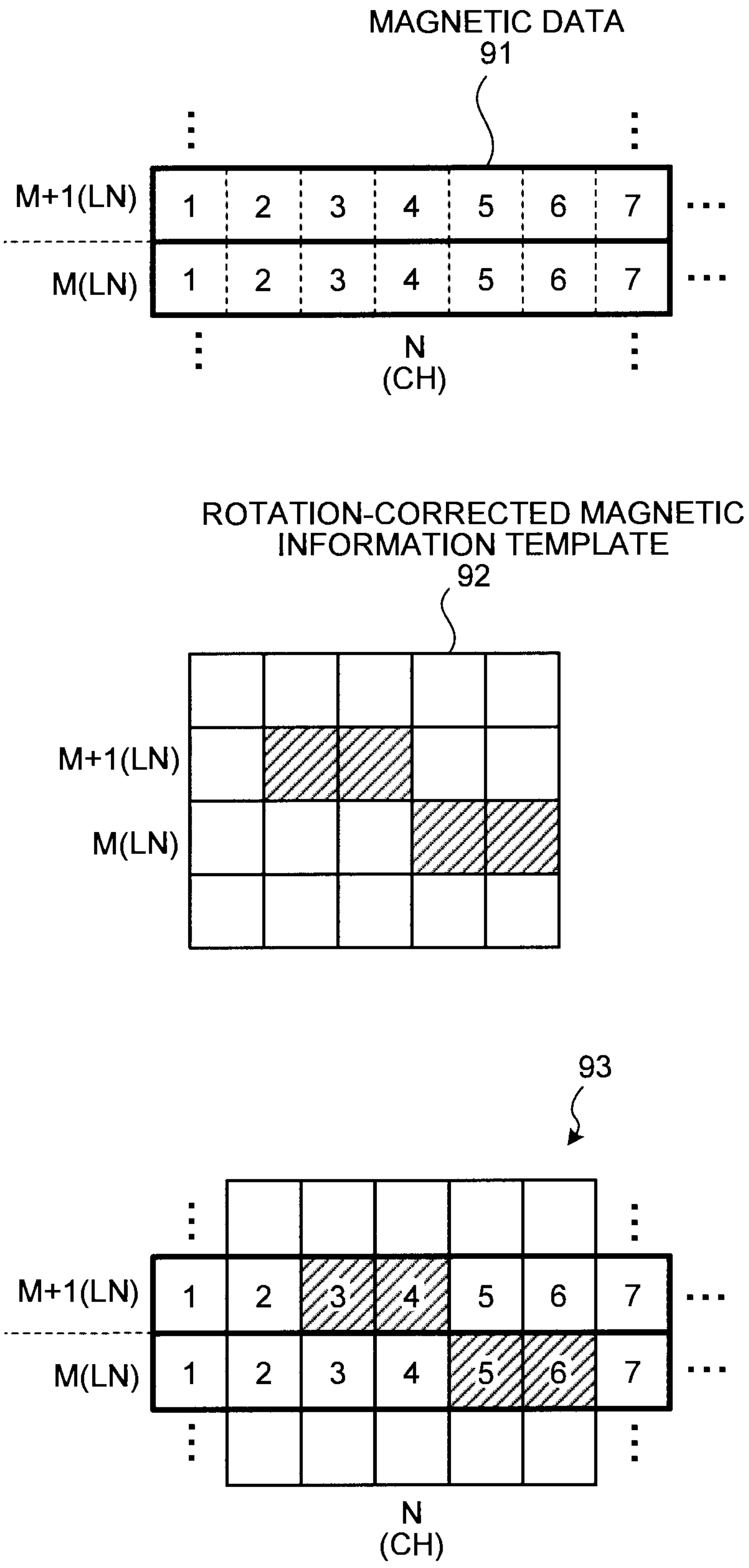
FIG. 9 is a diagram illustrating an outline of a process of applying the magnetic information template to magnetic data.

Next, a process of applying the magnetic information template 14*a* to the magnetic data, which is performed by the evaluation-value calculating unit 13*d*, is described with reference to FIG. 9. FIG. 9 is a diagram illustrating the outline of the process of applying the magnetic information template 14*a* to the magnetic data. In the figure, 91 denotes magnetic data in which data for a physical 1 CH is virtually assumed as pieces of data for 7 CH, and 92 denotes the rotation-corrected magnetic information template 14*a* on which evaluation target areas (see shaded portions in the figure) are specified.

As illustrated in 93 of the figure, when 91 of the figure and 92 of the figure are superimposed one on top of the other, "5" and "6" become the evaluation target areas in M (LN). In this case, assuming that a magnetic data value of the M (LN) is 722, each value of "1" to "7" is assumed as 100. Therefore, when evaluation is performed by using the total sum value in the area, 200 as a sum of the values in "5" and "6" is calculated as the evaluation value. Furthermore, in M+1 (LN), because "3" and "4" become the evaluation target areas, 200 as a sum of the values in "3" and "4" is calculated as the evaluation value.

Figure 10:
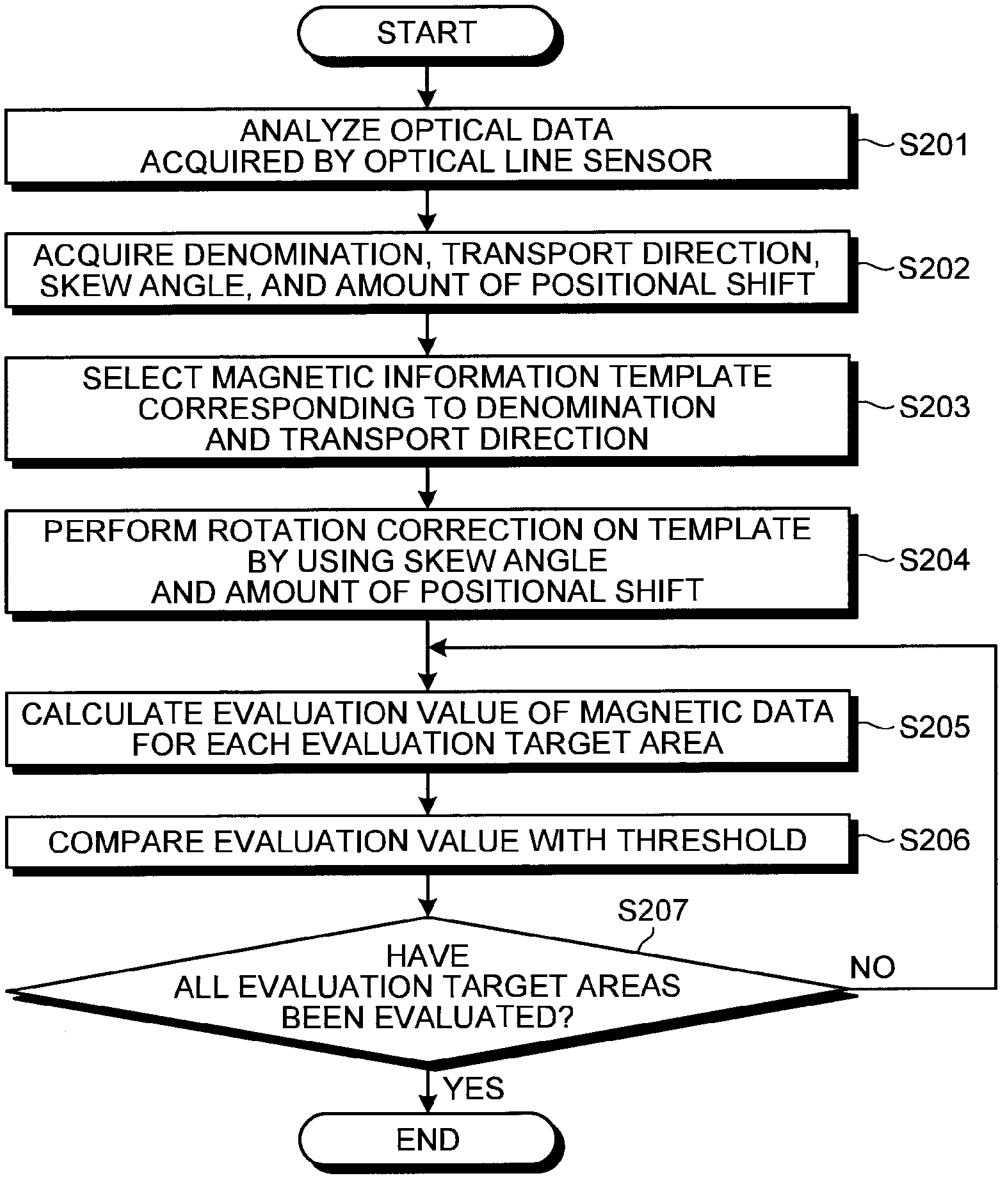
FIG. 10 is a flowchart illustrating a process procedure performed by the paper-sheet recognition apparatus.

Next, a process procedure performed by the paper-sheet recognition apparatus 10 according to the embodiment is described with reference to FIG. 10. FIG. 10 is a flowchart illustrating the process procedure performed by the paper-sheet recognition apparatus 10. As illustrated in the figure, the image analyzing unit 13*a* analyzes optical data acquired by the optical line sensor 11 (Step S201), and acquires a banknote denomination, a transport direction, a skew angle, and an amount of positional shift (Step S202).

Subsequently, the template selecting unit 13*b* selects the magnetic information templates 14*a* corresponding to the banknote denomination and the transport direction (Step S203), and the template converting unit 13*c* performs the rotation correction on the template selected at Step S203 by using the skew angle and the amount of positional shift (Step S204). Then, the evaluation-value calculating unit 13*d* calculates the evaluation value of the magnetic data for each evaluation target area (Step S205), and the comparing unit 13*e* compares the evaluation value with a threshold (Step S206).

Then, it is determined whether the evaluation has been completed for all the evaluation target areas or not (Step S207). When the evaluation has been completed for all the evaluation target areas (YES at Step S207), process ends. On the other hand, when an unevaluated evaluation target area is present (NO at Step S207), process from Step S205 is repeated. At Step S207, it is explained that the process ends when the evaluation is completed for all the evaluation target areas. However, it is possible to immediately end the process when even one evaluation result for the evaluation target areas indicates non genuiness.

In the above descriptions, an example has been explained in which the magnetic information template 14*a* is subjected to the rotation correction based on the optical data acquired by the optical line sensor 11, and the rotation-corrected magnetic information template 14*a* is compared with the magnetic data acquired by the magnetic line sensor 12. However, the present invention is not limited to this example, and it is possible to combine a process of performing the rotation correction on the optical data and comparing the rotation-corrected optical data with the optical information template. Therefore, a paper-sheet recognition apparatus that additionally performs the process of performing the rotation correction on the optical data is described below with reference to FIGS. 11 and 12.

Figure 11:
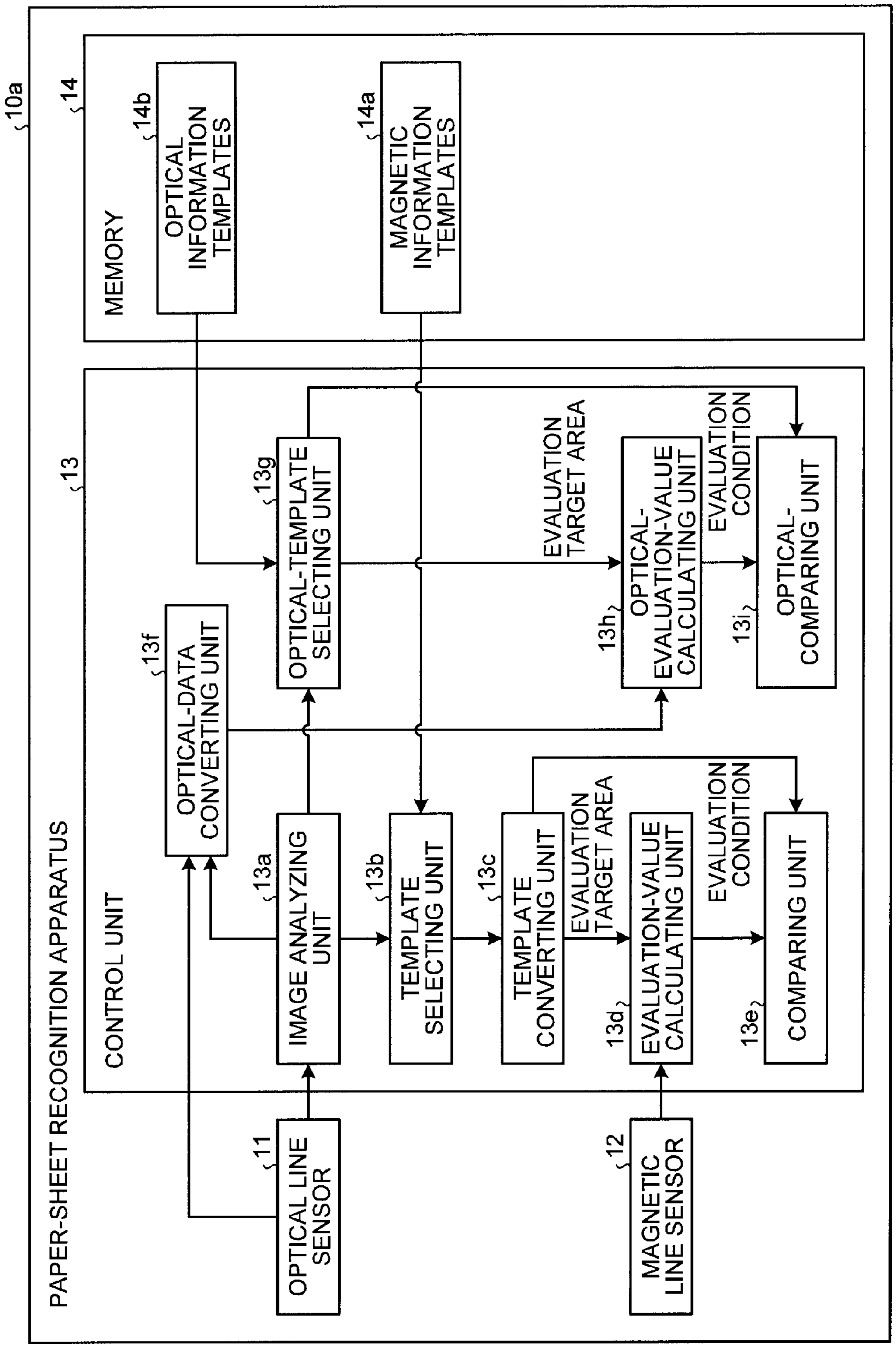
FIG. 11 is a block diagram illustrating a configuration of a paper-sheet recognition apparatus according to a modified example.

FIG. 11 is a block diagram illustrating a configuration of a paper-sheet recognition apparatus 10*a* according to a modified example. In FIG. 11, components corresponding to the components of the paper-sheet recognition apparatus 10 illustrated in FIG. 2 are denoted by identical symbols, and explanations about the common components will be omitted or only brief explanation will be given.

As illustrated in FIG. 11, the control unit 13 in the paper-sheet recognition apparatus 10*a* further includes an optical-data converting unit 13*f*, an optical-template selecting unit 13*g*, an optical-evaluation-value calculating unit 13*h*, and an optical-comparing unit 13*i*. The memory 14 further stores therein an optical information templates 14*b*.

The optical-data converting unit 13*f* is a processing unit that performs a process of receiving the skew angle and amount of positional shift of a banknote from the image analyzing unit 13*a* and performing the rotation correction on the optical data received from the optical line sensor 11 based on the received skew angle and amount of positional shift. The optical-data converting unit 13*f* also performs a process of sending the rotation-corrected optical data to the optical-evaluation-value calculating unit 13*h*. The rotation correction is already explained above with reference to FIGS. 8A and 8B, and therefore, explanation thereof is omitted.

The optical-template selecting unit 13*g* is a processing unit that performs a process of selecting a template corresponding to a banknote denomination and a banknote transport direction, which are received from the image analyzing unit 13*a*, from the optical information templates 14*b* in the memory 14. In this case, the optical-template selecting unit 13*g* selects a template (from the optical information templates 14*b*) for the same portion as that for the template (from the magnetic information templates 14*a*) selected by the template selecting unit 13*b*.

The optical-template selecting unit 13*g* also performs a process of sending an evaluation target area contained in the selected template to the optical-evaluation-value calculating unit 13*h* and sending an evaluation condition contained in the template to the optical-comparing unit 13*i*.

The optical-evaluation-value calculating unit 13*h* is a processing unit that performs a process of calculating an evaluation value, such as a total sum value in an area, a maximum value in the area, and a minimum value in the area, of the optical data subjected to the rotation correction by the optical-data converting unit 13*f* for each evaluation target area received from the optical-template selecting unit 13*g*. The optical-evaluation-value calculating unit 13*h* also performs a process of sending the calculated evaluation value to the optical-comparing unit 13*i*. In this case, because the resolution of the optical data is identical to the resolution of the optical information templates 14*b*, the application process (see FIG. 9) performed on the magnetic data is not necessary.

The optical-comparing unit 13*i* is a processing unit that performs a process of comparing the evaluation value for each evaluation target area received from the optical-evaluation-value calculating unit 13*h* with the evaluation condition for each evaluation target area received from the optical-template selecting unit 13*g*. The optical-comparing unit 13*i* determines that a banknote as a recognition target is authentic when the evaluation conditions for all the evaluation target areas are satisfied. Thus, the authenticity of the banknote is determined by using the comparison result from the optical-comparing unit 13*i* and the comparison result from the comparing unit 13*e*.

The optical information templates 14*b* are templates provided for the respective banknote denominations and the respective transport directions, and containing positional information of the evaluation target areas and the evaluation conditions for the respective evaluation target areas. In this case, the resolution of the optical information template 14*b* is identical to the resolution of the optical line sensor 11. The contents of the optical information templates 14*b* are similar to the contents of the magnetic information templates 14*a* (see FIG. 7), so that explanation thereof is omitted.

Figure 12:
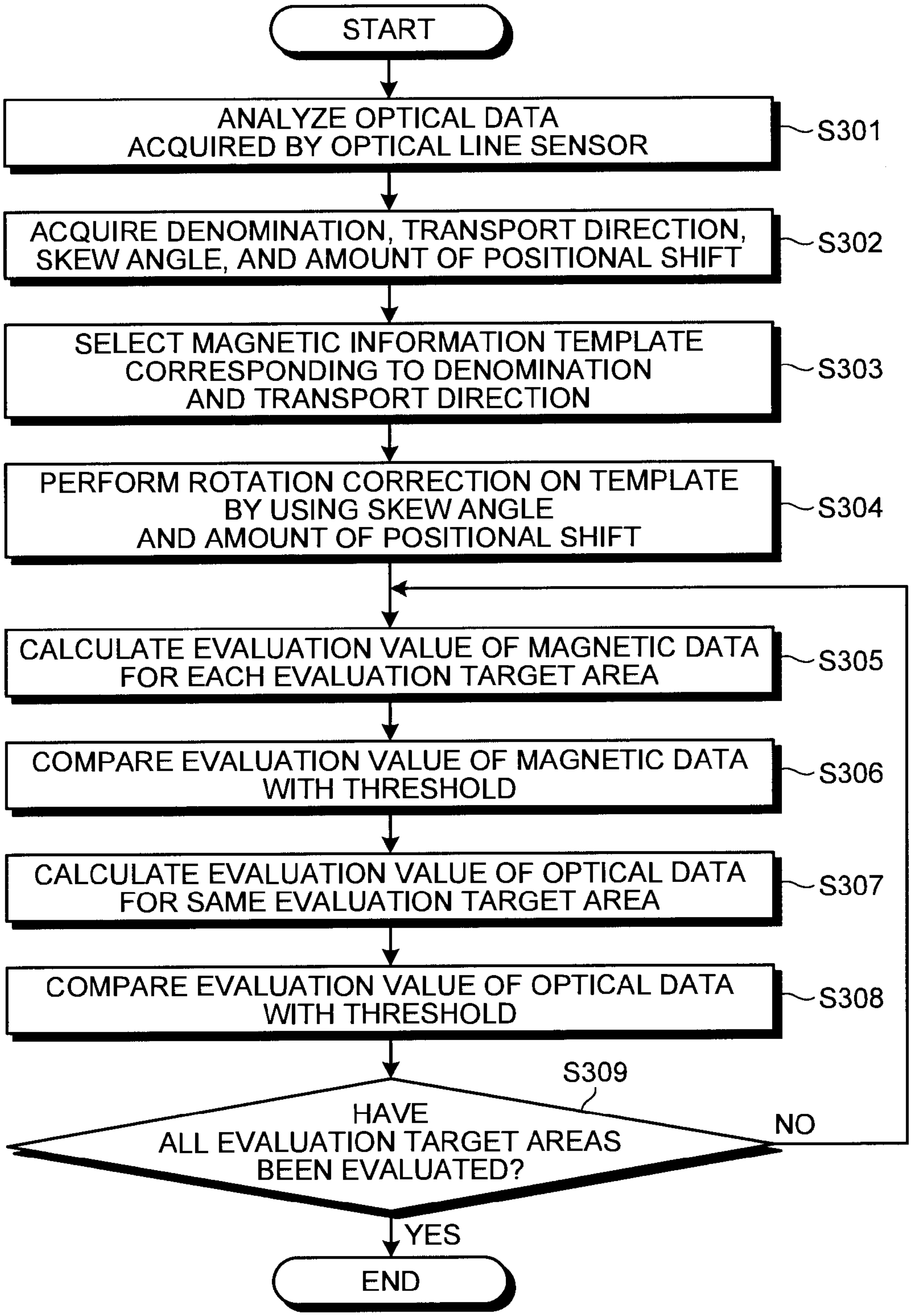
FIG. 12 is a flowchart illustrating a process procedure performed by the paper-sheet recognition apparatus according to the modified example.

Next, a process procedure performed by the paper-sheet recognition apparatus 10*a* according to the modified example is described with reference to FIG. 12. FIG. 12 is a flowchart illustrating the process procedure performed by the paper-sheet recognition apparatus 10*a* according to the modified example. As illustrated in the figure, the image analyzing unit 13*a* analyzes optical data acquired by the optical line sensor 11 (Step S301), and acquires a banknote denomination, a transport direction, a skew angle, and an amount of positional shift (Step S302).

Subsequently, the template selecting unit 13*b* selects the magnetic information templates 14*a* corresponding to the banknote denomination and the transport direction (Step S303), and the template converting unit 13*c* performs the rotation correction on the template selected at Step S303 by using the skew angle and the amount of positional shift (Step S304). Then, the evaluation-value calculating unit 13*d* calculates the evaluation value of the magnetic data for each evaluation target area (Step S305), and the comparing unit 13*e* compares respective evaluation values of the magnetic data with corresponding thresholds (Step S306).

The optical-evaluation-value calculating unit 13*h* also calculates an evaluation value of the optical data subjected to the rotation correction by the optical-data converting unit 13*f* for each evaluation target area identical to the evaluation target area used at Step S305 (Step S307), and the optical-comparing unit 13*i* compares respective evaluation value of the optical data with corresponding thresholds (Step S308).

Then, it is determined whether the evaluation has been completed for all the evaluation target areas (Step S309). When the evaluation has been completed for all the evaluation target areas (YES at Step S309), process ends. On the other hand, when an unevaluated evaluation target area remains (NO at Step S309), the process from Step S305 is repeated. At Step S309, it is explained that the process ends when the evaluation is completed for all the evaluation target areas. However, it is possible to immediately end the process when even one evaluation result for the evaluation target areas indicates non-genuiness.

In this manner, the paper-sheet recognition apparatus according to the modified example is configured such that the memory further stores therein the optical templates defined in advance for the respective paper-sheet types and the respective transport directions, the optical-data converting unit performs the rotation correction on the optical data based on the skew angle obtained by analyzing the optical data, the optical-template selecting unit selects the optical template of the same portion as that of the magnetic template, and the optical-comparing unit compares the selected optical template with the optical data that has been converted and subjected to rotation correction.

Thus, because the process of comparing the rotation-corrected optical data with the optical information template is added, it is possible to perform an optical recognition process in addition to a magnetic recognition process on a paper sheet to be recognized. Consequently, it is possible to further improve paper-sheet recognition accuracy.

In the embodiment, two examples have been explained in which the magnetic template and optical template are used. In one example, the magnetic data is fixed and the magnetic template is subjected to rotation correction. In another example, the optical template is fixed and the optical data is subjected to rotation correction. However, the present invention is not limited to the examples. The concept of the present invention includes cases such as a case in which the magnetic template is fixed and the magnetic data is subjected to rotation correction; a case in which the optical data is fixed and the optical template is subjected to rotation correction; a case in which both the magnetic data and the optical data are subjected to rotation correction; and a case in which both the magnetic template and the optical template are subjected to rotation correction.

As described above, according to the embodiment, the paper-sheet recognition apparatus is configured such that the memory stores therein the magnetic templates defined in advance for the respective paper-sheet types and the respective transport directions, the template selecting unit selects a magnetic template based on the optical data acquired by the optical line sensor, and the comparing unit compares the selected magnetic template with the magnetic data acquired by the magnetic line sensor.

Thus, because the magnetic template is selected based on the optical data, any magnetic templates in which the skew and the positional shift are taken into consideration are not necessary. As a result, the number of the magnetic templates can be reduced. Furthermore, because the magnetic templates selectable based on the optical data, i.e., the magnetic templates corresponding to a design on a paper sheet, are used, an evaluation target area can be defined on the magnetic template according to the resolution of the optical data.

Furthermore, according to the embodiment, the magnetic template is selected based on a paper-sheet type and a paper-sheet transport direction that are obtained by analyzing the optical data. Therefore, it is possible to reliably select a magnetic template appropriate for the paper-sheet type and the paper-sheet transport direction.

Moreover, according to the embodiment, the magnetic template is subjected to rotation correction based on the optical data and the rotation-corrected magnetic template is compared with the magnetic data. Therefore, it is not necessary to provide the templates in which the skew and the positional shift are taken into consideration.

Furthermore, according to the embodiment, the magnetic template is defined at optical resolution representing the resolution of the optical line sensor, and the magnetic template is compared with the magnetic data after dividing the magnetic data into pieces of data each corresponding to the optical resolution. Therefore, it is possible to appropriately apply the magnetic data that is minutely defined at the optical resolution to the magnetic data having different resolution.

Moreover, according to the embodiment, the magnetic template is defined as an assembly of an evaluation target area, which represents an area whose magnetic data is evaluated, and an evaluation condition for the evaluation target area, and the magnetic template is compared with the magnetic data in the evaluation target area by using the evaluation condition. Thus, because the evaluation condition corresponding to the evaluation target area is used, it is possible to perform various evaluation in accordance with magnetic distribution of paper sheets.

Furthermore, according to the embodiment, optical templates defined in advance for respective paper-sheet types and respective paper-sheet transport directions are stored, the optical data is subjected to rotation correction based on a skew angle obtained by analyzing the optical data, an optical template for the same portion as that for the magnetic template is selected, and the selected optical template is compared with the optical data converted and subjected to the rotation correction. Thus, because recognition based on the optical data is performed in combination, it is possible to further improve the recognition accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A paper-sheet recognition apparatus that recognizes a paper sheet, which is being transported, by using an optical line sensor and a magnetic line sensor, the paper-sheet recognition apparatus comprising:

a memory unit that stores therein magnetic templates defined in advance for respective types and respective transport directions of paper sheets, wherein the magnetic templates are defined at optical resolution representing resolution of the optical line sensor;

a selecting unit that selects a magnetic template based on a type and a transport direction of the paper sheet, the type and the transport direction being obtained by analyzing optical data acquired by the optical line sensor; and a comparing unit that divides magnetic data acquired by the magnetic line sensor into pieces of data each corresponding to the optical resolution, and compares the magnetic template selected by the selecting unit with the divided magnetic data.

2. The paper-sheet recognition apparatus according to claim 1, wherein the comparing unit performs rotation correction on the magnetic template based on the optical data, and compares the rotation-corrected magnetic template with the divided magnetic data.

3. The paper-sheet recognition apparatus according to claim 1, wherein the comparing unit performs rotation correction on the magnetic template based on a skew angle and amount of positional shift of the paper sheet obtained by analyzing the optical data thereof, and compares the rotation-corrected magnetic template with the divided magnetic data.

4. The paper-sheet recognition apparatus according to claim 1, wherein the magnetic template is defined as an assembly of an evaluation target area, which represents an area whose magnetic data is evaluated, and an evaluation condition for the evaluation target area, and the comparing unit compares the magnetic template with the magnetic data in the evaluation target area by using the evaluation condition.

5. A paper-sheet recognition apparatus that recognizes a paper sheet, which is being transported, by using an optical line sensor and a magnetic line sensor, the paper-sheet recognition apparatus comprising:

a memory unit that stores therein magnetic templates and optical templates defined in advance for respective types and respective transport directions of paper sheet, wherein the magnetic template is defined at optical resolution representing resolution of the optical line sensor;

an optical-data converting unit that performs rotation correction on optical data based on a skew angle and amount of positional shift of the paper sheet obtained by analyzing the optical data by the optical line sensor;

a magnetic-template selecting unit that selects a magnetic template based on a type and transport direction of the paper sheet, the type and transport direction being obtained by analyzing the optical data;

an optical-template selecting unit that selects an optical template for a same portion as a portion for the magnetic template;

a comparing unit that divides magnetic data acquired by the magnetic line sensor into pieces of data each corresponding to the optical resolution, and compares the magnetic template selected by the magnetic-template selecting unit with the divided magnetic data; and an optical comparing unit that compares the optical template selected by the optical-template selecting unit with the optical data converted and subjected to the rotation correction by the optical-data converting unit.

6. The paper-sheet recognition apparatus according to claim 5, wherein the comparing unit further performs rotation correction on the magnetic template based on the skew angle and amount of positional shift of the paper sheet obtained by analyzing the optical data thereof, and compares the rotation-corrected magnetic template with the magnetic data.

7. The paper-sheet recognition apparatus according to claim 5, wherein the magnetic template is defined as an assembly of an evaluation target area, which represents an area whose magnetic data is evaluated, and an evaluation condition for the evaluation target area, and the comparing unit compares the magnetic template with the magnetic data in the evaluation target area by using the evaluation condition.

8. The paper-sheet recognition apparatus according to claim 5, wherein the optical template is defined as an assembly of an evaluation target area, which represents an area whose magnetic data is evaluated, and an evaluation condition for the evaluation target area, and the optical comparing unit compares the optical template with the optical data in the evaluation target area by using the evaluation condition.

* * * * *